United States Patent [19]

Fromwiller et al.

[11] Patent Number: 5,442,028

[45] Date of Patent: Aug. 15, 1995

[54] CURATIVES FOR AQUEOUS ADHESIVES

[75] Inventors: John K. Fromwiller, McHenry, Ill.; Steven J. Ney, Sharon, Wis.

[73] Assignee: Morton International, Inc., Chicago, Ill.

[21] Appl. No.: 109,873

[22] Filed: Aug. 20, 1993

[51] Int. Cl.⁶ .................. C08G 18/00; C08G 18/30; C08J 3/00; C08L 3/20
[52] U.S. Cl. ..................... 528/44; 524/590; 528/76
[58] Field of Search ............ 524/590; 528/44, 76

[56] References Cited

U.S. PATENT DOCUMENTS 4,663,377 5/1987 Hombach et al. ............... 524/196
4,745,151 5/1985 Noll et al. ..................... 524/591

Primary Examiner—Paul R. Michl
Assistant Examiner—Patrick Niland
Attorney, Agent, or Firm—Wayne E. Nacker; Gerald K. White

[57] ABSTRACT

1. An isocyanate curative used for curing water-borne polyurethane adhesive compositions and providing enhanced water-resistance to the cured adhesive is the reaction product of A) between about 30 and about 60 wt. % one or more polyethers formed from alkyl oxides, between about 5 and about 40 mole percent of the total polyether content comprising propylene oxide units and between about 60 and about 95 mole percent of the total polyether content comprising polyethylene oxide units, B) between about 1 and about 10 wt % of an aliphatic diol(s), C) between about 10 and about 10 wt % of an aliphatic triol(s) or polyols having hydroxyl functionality greater than 3, and D) between about 30 and about 50 wt % of an aliphatic diisocyanate, the aliphatic diisocyanate being provided in an amount to provide an NCO/OH ratio of between about 1.5 and about 2, the curative having an NCO content of between about 5 and about 10 wt. % and an NCO equivalent weight of between about 400 and about 1200.

2 Claims, No Drawings

CURATIVES FOR AQUEOUS ADHESIVES

The present invention is directed to novel isocyanate curatives for aqueous adhesives, particularly aqueous adhesives based on dispersed polyurethanes.

BACKGROUND OF THE INVENTION

U.S. Pat. No. 4,663,377, the teachings of which are incorporated herein by reference, is directed to dispersible polyisocyanate compositions suitable for curing aqueous adhesives, including aqueous polyurethane dispersions. In this patent, polyisocyanates are emulsified using a surfactant which is preferably the reaction product of the polyisocyanate and a polyether. The major portion of the monomers used to form the polyether comprises ethylene oxide. Ethylene oxide units, as opposed to propylene oxide units (or higher alkyl oxide units), are used because they are known to promote water-compatibility.

The present invention is directed to curatives for aqueous adhesives, particularly dispersed polyurethane adhesives, which provide enhanced water-resistance, e.g., humidity resistance, to the cured adhesive. The curative is particularly suitable when used in a laminate adhesives, i.e., an adhesive to bond polymer and/or metal layers together.

SUMMARY OF THE INVENTION

In accordance with the invention, an isocyanate curative for hydroxy group-containing aqueous adhesives, particularly adhesives based upon dispersed polyurethanes, is provided which develops a cured adhesive with enhanced water-resistance. The curative is a polymeric material formed by reacting:

A) between about 30 and about 60 wt. % one or more polyethers formed from alkyl oxides, between about 60 and about 95 mole percent of the total polyether content comprising propylene oxide units and between about 5 and about 40 mole percent of the total polyether content comprising polyethylene oxide units, B) between about 1 and about 10 wt % of aliphatic diol(s), C) between about 1 and about 10 wt % of aliphatic triol(s) or higher number polyol(s), and D) between about 30 and about 50 wt % of an aliphatic diisocyanate, the aliphatic diisocyanate being provided in an amount to provide an NCO/OH ratio of between about 1.5 and about 2, preferably between about 1.6 and about 1.95. The curative has an NCO content of between about 5 and about 10 wt. % and an NCO equivalent weight of between about 400 and about 1200. The curative is neither soluble nor dispersible in water, but is readily taken up by the dispersed urethane phase of an aqueous polyurethane adhesive.

DETAILED DESCRIPTION OF CERTAIN PREFERRED EMBODIMENTS

The isocyanate compositions in above-referenced U.S. Pat. No. 4,663,377 are emulsifiable in aqueous solution due to the high ethylene oxide content of the polyether of the polyisocyanate/polyether reaction product which provides the preferred surfactant. Applicants have found that improved water-resistance in the cured adhesive is attained by the curative of the present invention which is neither soluble in nor dispersible in water, but which, surprisingly, is readily taken up in the urethane phase of an aqueous polyurethane dispersion. The compositions of the present invention are substantially more hydrophobic than the compositions of the U.S. Pat. No. 4,663,377 patent because the polyethers used to form the compositions of the present invention are formed, in total, from a high polypropylene oxide content, as opposed to the use of polyethers having a higher ethylene oxide content, as per the U.S. Pat. No. 4,663,377.

It is believed that the high, i.e., between about 60 and about 90 mole percent, propylene oxide content of the polyethers used to form the curative compositions of the present invention contributes to a cured adhesives having improved water-resistance. The minor amount of ethylene oxide content, i.e., between about 5 and about 40 mole percent, promotes uptake of the curative in an aqueous adhesive composition. The polyethers may optionally include higher molecular weight alkyl oxides, up to about 10 mole percent, in total. While the recited ranges of propylene oxide content and ethylene oxide content apply to the total amount of polyether content used to form the curative composition, polyethers having both lower and higher ethylene oxide contents may be combined to provide the recited ranges of ethylene oxide content and propylene oxide content. Indeed, certain preferred embodiments, as exemplified hereinafter, use such combinations of polyethers to form the curatives. In a most preferred embodiment, between about 35 and about 45 wt % of the polyether content (A) is a polyether (a1) comprising between about 50 and about 65 mole percent propylene oxide units and between about 35 and about 50 mole percent ethylene oxide units; between about 35 and about 45 wt % of the polyether content (A) is a polyether (a2) comprising between about 80 and about 90 mole percent propylene oxide units and between about 10 and about 20 mole percent ethylene oxide units; and between about 10 and about 15 wt% of the polyether content (A) is a polyether (a3) comprising between about 95 and 100 mole percent propylene oxide units, balance other alkyleneoxide units.

The aliphatic diol content, i.e., used in forming the curative at a level of between about 1 and about 10 wt. % of the curative composition, is used for chain extension and to increase the number of urethane linkages in the curative composition. Suitable diols include, but are not limited to ethylene glycol, neopentyl glycol, dipropylene glycol, butylene glycol.

The aliphatic triol or higher number polyol, preferable triol, content is used in forming the curative at a level of between about 1 and about 10 wt. % of the curative. This component is also used for chain extension and to increase the number of urethane linkages. The triol (or higher polyol) content also introduces some branching, enhancing the cross-link density. Suitable triols include but are not limited to, glycerine and trimethylol propane.

Aliphatic diisocyanates are used at a level whereat the curative is NCO-terminated, i.e., at an NCO/OH ratio of about 1.5 to about 2, preferably about 1.6 to about 1.95. Aliphatic diisocyanates are used for UV-stability (relative to aromatic diisocyanates). Suitable diisocyanates include but are not limited to 1,6-hexamethylene diisocyanate, isophorone diisocyanate (IPDI), and meta-tetramethylxylylene diisocyanate (m-TMXDI). Isophorone diisocyanate is the preferred disocyanate, having a more reactive NCO group which reacts most readily in the curative forming reaction and a less reactive NCO group which is the most prevalent unreacted NCO species left available for the curing reaction. The less reactive NCO group increases the pot-life of the curative once the curative is added to the aqueous dispersion of hydroxyl group-containing polymer.

The curative may be dissolved in up to about 75 wt. percent (relative to weight of the curative) of a suitable solvent, such as ethyl acetate, propylene carbonate, N-methylpyrrolidone. Typically, at least about 5 wt. % solvent (relative to the weight of the curative) is present, as the curative-forming reaction is facilitated by the presence of some solvent. From a VOC standpoint, it is desirable to minimize volatile organic solvents.

The curative of the present invention could conceivably be used to cross-link (cure) any hydroxyl group-containing polymeric adhesive composition. The primary intended use is to cure waterborne polyurethane compositions in which polyurethane is dispersed in an aqueous medium. The curative, when added to such a composition, is readily taken up by the polyurethane phase upon mild mixing conditions of the curative with the water-borne polyurethane composition. For maximum cure, the curative will be added so that the NCO is at the stoichiometric equivalent of the hydroxyl group-containing polymer; however, the amount may be less than stoichiometric if less cross-linking is desired.

The curative of the present invention is particularly suitable for water-borne polyurethane adhesive compositions used in forming polymer and/or metal laminates. Materials which may be laminated by such adhesive compositions include, but are not limited to, nylon, polyethylene, nylon, aluminum foil, ethylene vinyl acetate, ethylene vinyl alcohol, polyvinyl acetate, polyvinyl alcohol, polyester and polypropylene.

The invention will now be described in greater detail by way of specific examples.

EXAMPLE 1

A curative is formulated as follows:

| Material | Wt. % | Solids Wt. % | Func. |
|---|---|---|---|
| Polymer a1, 45 mole % EO, 55% PO MW 2000 | 14.17 | 18.89 | 2 |
| Polymer a2, 12 mole % EO, 88% PO MW 2000 | 14.17 | 18.89 | 2 |
| Polymer a3 100% PO | 8.34 | 11.12 | 2 |
| Neopentyl glycol (NPG) | 2.71 | 3.61 | 2 |
| trimethylol propane (TMP) | 1.44 | 1.92 | 3 |
| Isophorone diisocyanate (IPDI) | 34.11 | 45.46 | 2 |
| DBTDL (tin catalyst) | 0.08 | 0.11 | |
| Propylene Carbonate (solvent) | 24.98 | | |
| | 100.00 | 100.00 | |

EO = proplyene oxide, PO = propylene oxide, DBTDL = Dibutyltindilaurate, Func. = functionally The curative was synthesized according to the following protocol:
1. The reactor was sparged with nitrogen.
2. The polyethers, catalyst and IPDI were added and slowly heated to 50° C.
3. The reaction mixture was held at 50° C. for one hour.
4. The TMP was added and the temperature held at 50° C. for one hour.
5. The NPG was added and the temperature held at 50° C. for one hour.
6. The propylene carbonate was added and mixed for 30 min.
7. Sampling for % NCO and % solids was done until a % NCO of greater than 6.3 and a solids level of 75% solids was achieved.

Laminates were prepared using an aqueous polyurethane composition sold by Morton International, Inc. designated X92-30 with a) the curative produced in this example and b) Desmodur ® DA sold by Miles laboratory. Each was used at a stoichiometric equivalence relative to the polyurethane dispersion. Laminating was performed with a pilot plant laminator. Bond strengths (gram/inch) were determined initially and at several storage intervals. Also a bond strength was determined after 12 days storage followed by 1 day storage at 100° F., 93% relative humidity. The results are as follows:

| polyester/ HSLDPE | Init. | 1 day | 8 days | 14 days | 28 days | humidity |
|---|---|---|---|---|---|---|
| curative a | 550 | 770 | 730 | 750 | 740 | 810 |
| curative b | 610 | 650 | 670 | 550 | 580 | 590 |
| nylon/ HSLDPE | | | | | | |
| a | 880 | 710 | 640 | 580 | 610 | 560 |
| b | 870 | 870 | 860 | 800 | 900 | 370 |
| polyester/ Al 2 mil foil | | | | | | |
| a | 450 | 510 | 480 | 490 | 680 | 380 |
| b | 330 | 340 | 410 | 350 | 380 | 230 |
| polypropylene/ Al 2 mil foil | | | | | | |
| a | 370 | 450 | 500 | 440 | 500 | 330 |
| b | 40 | 120 | 150 | 140 | 100 | 180 |

It is seen that the curative perform as well or better than the Desmodur ® DA both initially or in storage. Significantly, it performs much better under hot, humid conditions.

EXAMPLE 2

A curative was produced formulated as follows and prepared in the manner of the curative in Example 1.

| Material | Wt. % |
|---|---|
| Polymer a1 | 17.28 |
| Polymer a2 | 17.28 |
| Polymer a3 | 10.19 |
| Dipropylene glycol (DPG) | 4.30 |
| Glycerol | 1.41 |
| IPDI | 39.53 |
| DBTDL | 0.02 |
| Ethyl Acetate (EA) | 10.00 |
| | 100.00 (total) |

In testing, performed in a manner similar to example 1, this curative similarly exhibited enhanced resistance to humidity relative to Desmodur ® DA.

What is claimed is:
1. An isocyanate curative which is the reaction product of materials comprising
   A) between about 30 and about 60 wt. % of a mixture of polyethers formed from alkylene oxides, between about 66 and about 84 mole percent of the total polyether content comprising propylene oxide units and between about 16 and about 34 mole percent of the total polyether content comprising polyethylene oxide units,
   said mixture of polyethers (A) comprising
      at least about 35 wt % of total polyether component being a polyether (a1) having between about 35 and about 50 mole percent ethylene oxide units and between about 50 and about 65 mole percent propylene oxide units, at least about 35 wt % of total polyether component being a polyether (a2) having between about 10 and about 20 mole percent ethylene oxide units and between about 80 and about 90 mole percent propylene oxide units, and at least about 10 wt % of total polyether component being a polyether (a3) having at least about 95 mole percent propylene oxide units, balance other alkylene oxide units, B) between about 1 and about 10 wt % of an aliphatic diol(s), C) between about 1 and about 10 wt % of an aliphatic triol(s) or polyols having hydroxyl functionality greater than 3, and D) between about 30 and about 50 wt % of an aliphatic diisocyanate, the aliphatic diisocyanate being provided in an amount to provide an NCO/OH ratio of between about 1.5 and about 2, the curative having an NCO content of between about 5 and about 10 wt. % and an NCO equivalent weight of between about 400 and about 1200.

2. A curative in accordance with claim 1 wherein said diisocyanate is isophorone diisocyanate.

* * * * *